United States Patent [19]

Takizawa

[11] Patent Number: 5,506,319
[45] Date of Patent: Apr. 9, 1996

[54] VINYL-SUBSTITUTED BENZYLORGANOTIN COMPOUND AND A POLYMER THEREOF

[75] Inventor: Toshiki Takizawa, Tokyo, Japan

[73] Assignee: Bridgestone Corporation, Tokyo, Japan

[21] Appl. No.: 204,458

[22] Filed: Mar. 2, 1994

[30] Foreign Application Priority Data

| Mar. 2, 1993 | [JP] | Japan | 5-041269 |
| Mar. 2, 1993 | [JP] | Japan | 5-041270 |
| Jun. 23, 1993 | [JP] | Japan | 5-152347 |

[51] Int. Cl.$^6$ ............................................. C08F 230/04
[52] U.S. Cl. .................... 526/240; 526/335; 526/340; 526/347; 526/347.1; 556/87
[58] Field of Search ............... 526/240, 340; 556/87

[56] References Cited

U.S. PATENT DOCUMENTS

| 4,397,994 | 8/1983 | Takeuchi | 525/332.3 |
| 4,857,618 | 8/1989 | Silver | 526/240 |
| 5,210,143 | 5/1993 | Silver | 525/288 |
| 5,268,439 | 12/1993 | Hergenrother | 526/340 |

FOREIGN PATENT DOCUMENTS

| 46-27069 | 8/1971 | Japan . |
| 47-13532 | 4/1972 | Japan . |
| 47-17449 | 5/1972 | Japan . |
| 47-42729 | 10/1972 | Japan . |
| 55-60539 | 5/1980 | Japan . |
| 56-163908 | 12/1981 | Japan . |
| 57-70137 | 4/1982 | Japan . |
| 57-55941 | 4/1982 | Japan . |
| 57-55912 | 4/1982 | Japan . |

OTHER PUBLICATIONS

Mizuno et al., Chemistry Letters, The Chemical Society of Japan, (1993) 1349–1352.
Reynolds et al., J. Chem. Soc., Perkin Trans. 2, (1977) 971.

*Primary Examiner*—Fred Zitomer
*Attorney, Agent, or Firm*—Sughrue, Mion, Zinn, Macpeak & Seas

[57] ABSTRACT

Disclosed are: a vinyl-substituted benzylorganotin compound represented by the following general formula A:

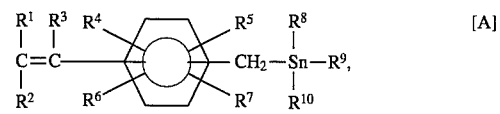

wherein $R^1R^2C=CR^3$—, $R^4$, $R^5$, $R^6$ and $R^7$ are each a group bonded to the benzene ring and $R^1$ to $R^7$ are each one of a hydrogen atom and a hydrocarbon group having 1 to 30 carbon atoms which is one of aliphatic, alicyclic and aromatic hydrocarbon groups, $R^8$ to $R^{10}$ are each a hydrocarbon group having 1 to 30 carbon atoms which is one of aliphatic, alicyclic and aromatic hydrocarbon groups and $R^1$ to $R^{10}$ may be the same or different from each other; a process for preparing a polymer comprising copolymerizing, in a hydrocarbon solvent in the presence of an organolithium compound as the initiator, (1) at least one of conjugated dienes and vinylaromatic hydrocarbons and (2) the organotin compound represented by the general formula A; a copolymer comprising (1) at least one of conjugated diene units and vinylaromatic hydrocarbon units and (2) units of a vinyl-substituted benzylorganotin compound monomer represented by the general formula A; and a rubber composition comprising 100 weight parts of a rubber material containing 30 weight parts or more of a polymer having number-average molecular weight of $5\times10^4$ to $80\times10^4$ which is obtained by the above process, 20 to 100 weight parts of carbon black and 0.1 to 5 weight parts of a vulcanizing agent.

8 Claims, 5 Drawing Sheets

VINYL-SUBSTITUTED BENZYLORGANOTIN COMPOUND AND A POLYMER THEREOF

BACKGROUND OF THE INVENTION

1. Field of the Invention

The present invention relates to a novel vinyl-substituted benzylorganotin compound, a polymer using it, a process for preparing the polymer and a novel rubber composition.

2. Description of the Related Art

Generally, industrially produced polymers are diversified into various kinds because of diversified requirements in each field of application. A polymer suited to a particular application is selected from among the various kinds and used according to requirements of the particular situation. For the purpose of providing polymers suited to various applications, various constituting units in polymers have been developed. Vinylaromatic hydrocarbons, such as styrene, are used as materials for coating compounds, drying oils, polymeric materials (rubbers, resins and the like) and the like. In particular, they are widely used industrially as material monomers of useful polymeric materials, such as polystyrene resins, rubber compounded high-impact polystyrene resins, acrylonitrile-butadiene-styrene copolymer (ABS), styrene-acrylonitrile resin (SAN), styrene-butadiene copolymer (SBR) and the like, with use of catalysts, such as radical polymerization catalysts, cationic polymerization catalysts, anionic polymerization catalysts and coordination catalysts.

On the other hand, tin compounds are known to provide various kinds of useful functional compounds. Among the tin compounds, inorganic tin compounds have been used as surface treatment agents for non-conductive materials such as glass, additives for reducing light transmission of ceramics and glass, electric plating material, tooth paste and the like. Organotin compounds have been widely used in industry as insecticides, agricultural chemicals, wood preserving agents, coating compounds for ship bottoms, anticorrosion agents for marine products, antistaining coating materials, fungicides, stabilizers for polyvinyl chloride, antioxidants for rubber, lubricants, various kinds of catalyst and the like. Organic functional groups bonded to tin, particularly chemical compounds containing benzyl-tin linkage, have been shown to be effective for modification of polymeric materials such as rubber because of the radical reactivity thereof and are industrially attracting attention.

Vinyl-substituted benzylorganotin compounds which contain both of the aforementioned favorable structures simultaneously are interesting as materials having a wide range of applications.

As specific chemical compounds which contain a carbon-carbon double bond, a phenyl group and an organotin bond are related to the vinyl-substituted benzylorganotin compounds, compounds having the following structures are known:

However, these compounds have many problems, such as reduced retention of the function after a long time and inferior compatibility with matrix polymer, because they are monomers. Therefore, they cannot be used satisfactorily in actual applications even though they have specific useful properties described above. Furthermore, single use of these tin compounds cannot satisfy requirements in diversifying fields.

In the field of polymers, rubber containing tin in the polymer chain has been attracting attention as materials satisfying various requirements.

In recent years, because lower fuel cost and safety are required for automobiles, lower rolling resistance (lower hysteresis loss), higher abrasion resistance and better wet skid resistance are desired for rubber compositions used in tread parts of tires.

For decreasing rolling resistance of rubber compositions used in tread parts of tires, properties of polymer contained in the rubber composition have been examined and natural rubber, polyisoprene rubber and polybutadiene rubber and the like have conventionally been used as the polymers having lower hysteresis loss. However, decreasing rolling resistance and increasing wet skid resistance contradict each other. When a rubber composition containing these polymers are used, wet skid resistance is decreased in the formulation by which rolling resistance can be decreased. In the formulation by which wet skid resistance is increased, rolling resistance of the rubber composition cannot be decreased because of an increase of a reinforcing agent, such as carbon black, and a plasticizer, such as oil, in the composition is required.

Styrene-butadiene copolymers containing different content of the bound styrene or different content of the vinyl linkage in the butadiene part were blended in a rubber composition to achieve a good property balance between abrasion resistance, rolling resistance and wet skid resistance of the rubber composition (Japanese Patent Publications 46- 27069, 47-42729, 47-13532 and 47-17449 and Japanese Patent Application Laid-Open Nos. 55-60539, 56-163908, 57-70137 and 57-55941). However, an increase of the content of bound styrene could not decrease rolling resistance even though wet skid resistance was improved.

Furthermore, when the vinyl content of the butadiene part of styrene-butadiene copolymer in a rubber composition is increased, the fracture properties and the abrasion resistance are deteriorated even though the wet skid resistance of a tire using the rubber composition is improved. Therefore, it is clear from these results that a favorable rubber composition used for tire treads which satisfies the requirement to decrease rolling resistance (hysteresis loss) and other requirements in response to the requirement to decrease fuel cost of automobiles cannot be obtained merely by optimizing the content of bound styrene, the microstructure of the butadiene part, the distribution of composition in the molecular chain and the molecular weight distribution.

As a polymer having significantly decreased hysteresis loss for use in a rubber composition to satisfy these requirements, there has been disclosed a polymer which is prepared by the coupling of a halogenated tin compound with lithium at the end of the polymer prepared by polymerization using an organolithium compound as the initiator in a hydrocarbon solvent, utilizing the useful property of the tin compound described above (Japanese Patent Application Laid-Open No. 57-55912 and others). This polymer has very excellent physical properties and is used in a rubber composition for tires having low rolling resistance, accordingly, lower fuel cost.

However, in a conventional polymer obtained by coupling the lithium at the chain end of the polymer with a halogenated tin compound, the coupling reaction does not reach 100% as expected from the theoretical calculation even when the equivalent amounts of the halogenated tin compound and the lithium at the chain end are brought into reaction. In industrial processes, the reaction may only reach about 60%. Coupling efficiency tends to further decrease when the molecular weight of the polymer having lithium at the end is increased. Furthermore, tin is bonded only to the end of the polymer chain. It is impossible to introduce tin compounds into parts of the chain other than the chain end by this method. Accordingly, because low hysteresis loss depends on the amount of tin in the polymer, the heretofore known method cannot provide a polymer having sufficiently decreased hysteresis loss even though a polymer in which hysteresis loss has decreased to some degree can be provided.

SUMMARY OF THE INVENTION

Accordingly, an object of the present invention is to provide a vinyl-substituted benzylorganotin compound useful as a material monomer of polymeric material and as a compound having various functional properties.

Another object of the present invention is to provide a novel copolymer which provides a rubber having low heat build-up and excellent fracture properties, a novel copolymer having excellent functional properties characteristic of organotin compounds and a process for preparation thereof.

A further object of the present invention is to provide a rubber composition for tires having excellent balance between abrasion resistance, lower rolling resistance (lower hysteresis loss) and wet skid resistance without having an adverse effect on fracture properties.

The aforementioned objects were achieved by the present invention as described hereinafter.

Thus, the vinyl-substituted benzylorganotin compound of the present invention is represented by the following general formula A:

wherein $R^1R^2C=CR^3-$, $R^4$, $R^5$, $R^6$ and $R^7$ are each a group bonded to the benzene ring, $R^1$, $R^2$, $R^3$, $R^4$, $R^5$, $R^6$ and $R^7$ are each a hydrogen atom or a hydrocarbon group having 1 to 30 carbon atoms which is one of aliphatic, alicyclic and aromatic hydrocarbon groups, $R^8$, $R^9$ and $R^{10}$ are each a hydrocarbon group having 1 to 30 carbon atoms which is one of aliphatic, alicyclic and aromatic hydrocarbon groups, and $R^1$, $R^2$, $R^3$, $R^4$, $R^5$, $R^6$, $R^7$, $R^8$, $R^9$ and $R^{10}$ may be the same or different from each other.

The copolymer of the present invention comprises (1) at least one of conjugated diene units and vinylaromatic hydrocarbon units and (2) units of a vinyl-substituted benzylorganotin compound monomer of general formula A.

The process for preparing a polymer of the present invention comprises copolymerizing, in a hydrocarbon solvent in the presence of an organolithium compound as the initiator, (1) at least one of conjugated dienes and vinylaromatic hydrocarbons and (2) a vinyl-substituted benzylorganotin compound of general formula A.

The rubber composition of the present invention comprises 100 weight parts of a rubber material containing 30 weight parts or more of a polymer having a number-average molecular weight of $5 \times 10^4$ to $80 \times 10^4$ which is obtained by copolymerizing, in a hydrocarbon solvent in the presence of an organolithium compound as the initiator, (1) at least one of conjugated dienes and vinylaromatic hydrocarbons and (2) a vinyl-substituted benzylorganotin compound monomer of general formula A; 20 to 100 weight parts of carbon black; and 0.1 to 5 weight parts of a vulcanizing agent.

DETAILED DESCRIPTION OF THE INVENTION

The present inventor extensively studied reactivities and various properties of vinyl-substituted benzyl compounds and organotin compounds and discovered that vinylbenzyltributyltin can be obtained from, for example, vinylbenzyl chloride, magnesium metal and tributyltin chloride and that vinylbenzyltributyltin thus obtained is an excellent material monomer for useful polymeric materials.

The present inventor also extensively studied polymerization reaction of organolithium compounds, chemical structures of organotin compound monomers and polymerization reactivity of the organotin compound monomers and discovered that the above organotin compound monomers have excellent copolymerization reactivity with, for example, butadiene and styrene and that copolymer obtained is a useful functional polymer having the characteristic properties of organotin compounds.

Furthermore, it was discovered that a rubber composition obtained by mixing the above copolymer used as a rubber material with carbon black and compounding the mixture with a vulcanizing agent and the like has an excellent balance between abrasion resistance, low hysteresis loss and wet skid resistance without adverse effect on fracture properties.

The present invention was arrived on the basis of the above discoveries.

In the vinyl-substituted benzylorganotin compound of the present invention which is represented by the general formula A, $R^1R^2C=CR^3—$, $R^4$, $R^5$, $R^6$ and $R^7$ are each a group bonded to the benzene ring of the benzylorganotin compound. They may be bonded to any position of the benzene ring. $R^1R^2C=CR^3—$ may be bonded to any of ortho- (o-), meta- (m-) and para- (p-) positions but is preferably bonded to the m-position or the p-position. $R^1$, $R^2$, $R^3$, $R^4$, $R^5$, $R^6$ and $R^7$ are each a hydrogen atom or a hydrocarbon group having 1 to 30 carbon atoms which is one of aliphatic, alicyclic, and aromatic hydrocarbon groups, $R^8$, $R^9$ and $R^{10}$ are each a hydrocarbon group having 1 to 30 carbon atoms which is one of aliphatic, alicyclic and aromatic hydrocarbon groups, and $R^1$, $R^2$, $R^3$, $R^4$, $R^5$, $R^6$, $R^7$, $R^8$, $R^9$ and $R^{10}$ may be the same or different from each other.

$R^1$ to $R^7$ described above are each preferably a hydrogen atom or a hydrocarbon group having 1 to 20 carbon atoms which is one of aliphatic, alicyclic and aromatic hydrocarbon groups, examples of the group are methyl, ethyl, propyl, n-butyl, sec-butyl, tert-butyl, octyl, cyclohexyl, cylclopentadienyl, phenyl, tolyl, xylyl, naphthyl, phenanthryl and the like. A hydrogen atom is particularly preferable. $R^8$ to $R^{10}$ described above are each preferably a hydrocarbon group having 1 to 20 carbon atoms which is one of aliphatic, alicyclic and aromatic hydrocarbon groups. Examples of the group are the same as those of $R^1$ to $R^7$.

Specific examples of the vinyl-substituted benzylorganotin compound described above are m-vinylbenzyltributyltin, m-vinylbenzyltrioctyltin, m-vinylbenzyltriphenyltin, m-(1-phenylvinyl)benzyltributyltin, p-isomers of these compounds and m-isomer and p-isomer mixtures of these compounds.

Method of production of the vinyl-substituted benzylorganotin compound is not particularly limited. For example, a method may be used in which a vinylbenzylmagnesium halide is first produced by reaction of a vinylbenzyl halide with magnesium metal in ether and then an organotin halide, such as tributyltin chloride, is brought into reaction with the vinylbenzylmagnesium halide to produce a vinyl-substituted benzylorganotin compound. The compound obtained can be identified as a vinyl-substituted benzylorganotin compound by GC-MS analysis and $^1$H-NMR analysis.

The vinyl-substituted benzylorganotin compound of the invention can be used as a chain reaction type monomer having polymerization ability of the vinyl group in the same manner as styrene and the like. The monomer is used, for example, in (1) homopolymerization, (2) bipolymerization with styrene, butadiene or the like and (3) terpolymerization with styrene and butadiene or the like. Thus, various kinds of useful polymer having benzylorganotin functional group can be easily obtained.

The compound of the present invention may be widely used, directly or in the form of the various kinds of polymers described above, as a modifier of polymeric materials, a stabilizer of polyvinyl chloride, an antioxidant for rubber, a plasticizer, an insecticide, a wood preserving agent and a coating compound for the bottoms of ships and to other conventional applications of organotin compounds.

The process for preparing a polymer of the present invention comprise copolymerization of (1) at least one of conjugated dienes and vinylaromatic hydrocarbons and (2) a vinyl-substituted benzylorganotin compound of aforesaid general formula A in a hydrocarbon solvent in the presence of an organolithium compound as the initiator.

According to this process, for example, 3 molecules in average of vinylbenzyltributyltin are copolymerized in a random copolymer chain of butadiene and styrene when a 3 mol equivalent of vinylbenzyltributyltin is added to 1 mol of lithium at the active end of the polymer chain in random copolymerization of butadiene and styrene in a hydrocarbon solvent in the presence of butyllithium as the initiator and an ether.

Because the copolymerization of the present invention proceeds with the mechanism of the anionic living polymerization, it is also possible that chain end of a polymer is modified through combination of the active lithium at the end of the chain with a coupling agent, such as a halogenated tin compound.

The conjugated diene in the present invention is a conjugated diene hydrocarbon having 4 to 12, preferably 4 to 8, carbon atoms in a molecule. Examples of the conjugated diene are 1,3-butadiene, isoprene, 2,3-dimethyl-1,3-butadiene, 1,3-pentadiene, octadiene and the like. The conjugated diene may be used singly or as a mixture of two or more kinds. Among these compounds, 1,3-butadiene is particularly preferable.

Examples of the vinylaromatic hydrocarbon in the present invention include styrene, α-methylstyrene, p-methylstyrene, o-methylstyrene, p-butylstyrene, vinylnaphthalene and like compounds. Among these compounds, styrene is particularly preferable.

In the present invention, the kinds of monomer units in the copolymer and composition of monomers used in the copolymerization are different depending on the application of the copolymer and are not particularly limited.

As an example, a copolymer used in a rubber composition for tires is described in the following. In the case of a copolymer (or copolymerization) of a conjugated diene and the organotin compound monomer mentioned above, the amount of the conjugated diene is 75 to 99.95 weight %, preferably 90 to 99.9 weight %. The amount of the organotin compound monomer is 0.05 to 25 weight %, preferably 0.1 to 5 weight %, both based on the total amount of the used monomer. In the case of a copolymer (or copolymerization) of a conjugated diene, a vinylaromatic hydrocarbon and said organotin compound monomer. The amount of the conjugated diene is 50 to 95 weight %, preferably 60 to 90 weight %, the amount of the vinylaromatic hydrocarbon is 5 to 50, preferably 5 to 40 weight %, and the amount of the organotin compound monomer is 0.05 to 25 weight %, preferably 0.1 to 5 weight %, all based on the total amount of the used monomer. In all these cases, not only is the effect of the organotin compound monomer not exhibited as expected from the used amount, but also the workability of the rubber composition prepared by using the copolymer is inferior when the amount of the organotin compound monomer is more than the specified range. When the amount of the organotin compound monomer is less than the specified range, the characteristic property of the present invention is not exhibited. Thus, amounts outside of the specified range are not preferable.

In the case of a copolymer used as a material having the specific functional properties of an organotin compound, as another example, a copolymer containing a larger amount of the organotin compound monomer than that described above is generally used.

In any of the applications, a single kind or a combination of two or more kinds of the organotin compound monomer can be introduced into the polymer molecule. A copolymer can be obtained either by the addition of an organotin compound monomer to the polymerization system during the propagation period of the polymerization between the initiation and the termination of the polymerization or by mixing an organotin compound monomer with at least one of conjugated dienes and vinylaromatic hydrocarbons in advance and charging the mixture into the polymerization system.

The copolymer of the present invention comprises (1) at least one of monomer units of conjugated dienes and monomer units of vinylaromatic hydrocarbons and (2) a monomer unit of a vinyl-substituted benzylorganotin compound of aforesaid general formula A. Therefore, examples of the copolymer include copolymers of a conjugated diene/an organotin compound monomer, copolymers of a vinylaromatic hydrocarbon/an organotin compound monomer and copolymers of a conjugated diene/a vinylaromatic hydrocarbon/an organotin compound monomer.

Distribution of components in the copolymer (a random structure, a block structure or a mixed structure thereof), microstructure of the conjugated diene part of the copolymer (for example, cis-1,4, trans-1,4 and vinyl structures in the butadiene part) and molecular weight of the copolymer can be adjusted as desired according to purpose by adopting the method of polymerization described below or by other methods. Molecular weight is adjusted as desired according to application and not particularly limited.

Because the copolymer of the present invention contains the benzylorganotin group, the copolymer can be provided with a rubbery property which is excellent in low heat build-up and resistance against fracture and the polymer property which is excellent in a functional properties characteristic of the organotin compound with a desired balance between them by suitably selecting the composition of the copolymer. When the copolymer is prepared with emphasis on the excellent rubbery property, it is used singly or as a blend with natural rubber or synthetic rubbers, extended with oil if necessary, mixed with conventional compounding ingredients for rubber vulcanization, vulcanized and applied to tires, industrial rubbers, such as antivibration rubbers, belts, hoses and the like, and other applications. When the copolymer is prepared with emphasis on the excellent functional property, it can be used in various functional applications described above in which conventional organotin compounds are used. In contrast to conventional organotin compounds which are low molecular weight compounds, the copolymer of the present invention exhibits more excellent functional properties, such as novel functional properties, preservation of the functional properties for a longer time and better compatibility, because it is a polymer (including oligomer) containing other copolymerized units.

Examples of the solvent of polymerization used in the present invention are aromatic hydrocarbon solvents, such as benzene, toluene, xylene and the like; aliphatic hydrocarbon solvents, such as n-pentane, n-hexane, n-butane and the like; alicyclic hydrocarbon solvents, such as methylcyclopentane, cyclohexane and the like; and mixtures thereof.

Examples of the organolithium compound used as the initiator in the present invention are alkyllithiums, such as n-butyllithium, ethyllithium, propyllithium, tert-butyllithium, hexyllithium, 1,4-dilithiobutane, reaction product of butyllithium and divinylbenzene and the like, alkylenedilithiums, such as phenyllithium, stilbenedilithium and the like. Preferable examples among them are n-butyllithium and tert-butyllithium. The organolithium compound may be used singly or as a mixture of two or more kinds. The amount of organolithium used in the polymerization is in the range of 0.2 to 30 mmol per 100 g of the total monomer.

In the present invention, additives generally used for enhancing polymerization reactivity and/or adjusting molecular structure of the polymer as desired according to application (molecular weight and microstructure; in the case of a copolymer, additionally, composition and distribution of monomer units), such as Lewis bases like ether compounds and tertiary amine compounds, can be added to the reaction system. Examples of the ether compound are diethyl ether, dibutyl ether, tetrahydrofuran, 2-methoxytetrahydrofuran, 2-methoxyethyltetrahydrofuran, dioxane, ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether and the like. Examples of the tertiary amine compound are triethylamine, tripropylamine, pyridine, N,N,N',N'-tetramethylethylenediamine, N,N,N',N'-tetraethylethylenediamine, N-methylmorpholine and the like. The ether compound and the tertiary amine are used each in an amount in the range of 0.05 to 1000 mol per 1 mol of the organolithium compound.

In the process for the preparation of a polymer of the present invention, at least one compound selected from the group consisting of silicon compounds, tin compounds, compounds containing isocyanate group in the molecule and compounds containing —CZ—N<linkage (Z stands for O or S) can be added as a modifier after finishing the polymerization reaction to provide the polymer with a desired property with change of the molecular design thereof.

Examples of the silicon compound are silicon tetrachloride, chlorotriethylsilane, chlorotriphenylsilane, dichlorodimethylsilane and the like.

Examples of the tin compound are halogenated tin compounds, such as tin tetrachloride, tin tetrabromide and the like, haloganated organotin compounds, such as diethyldichlorotin, dibutyldichlorotin, tributyltin chloride, diphenyldichlorotin, triphenyltin chloride and the like, and the like tin compounds.

Examples of the compound containing isocyanate group in the molecule are aromatic polyisocyanate compounds, such as phenyl isocyanate, 2,4-tolylene diisocyanate, 2,6-tolylene diisocyanate, diphenylmethane diisocyanate, naphthalene diisocyanate, dimers and trimers of these compounds and the like.

Examples of the compound containing —CZ—N<linkage (Z stands for O or S) are: amide compounds, such as formamide, N,N-dimethylformamide, acetamide, N,N-diethylacetamide, aminoacetamide, N,N-dimethyl-N',N'-dimethylaminoacetamide, N,N-dimethylaminoacetamide, N,N-dimethyl-N'-ethylaminoacetamide, acrylamide, N,N-dimethylacrylamide, N,N-dimethylmethacrylamide, nicotinamide, isonicotinamide, picolinic acid amide, N,N-dimethylisonicotinamide, succinamide, phthalamide, N,N,N',N'-tetramethylphthalamide, oxamide, N,N,N',N'-tetramethyloxamide, 1,2-cyclohexanedicarboxylic acid amide, 2-furancarboxylic acid amide, N,N-dimethyl- 2-furancarboxylic acid amide, quinoline-2-carboxylic acid amide, N-ethyl-N-methylquinolinecarboxylic acid amide and the like; imide compounds, such as succinimide, N-methylsuccinimide, maleimide, N-methylmaleimide, phthalimide, N-methylphthalimide and the like; lactam compounds, such as ε-caprolactam, N-methyl-ε-caprolactam, 2-pyrrolidone, N-methyl-2-pyrrolidone, 2-piperidone, N-methyl- 2-piperidone, 2-quinolone, N-methyl-2-quinolone and the like; urea compounds, such as urea, N,N'-dimethylurea, N,N-diethylurea, N,N,N',N'-tetramethylurea, N,N-dimethyl-N',N'-diphenylurea, N,N'-dimethylethyleneurea and the like; carbamic acid derivatives, such as methyl carbamate, methyl N,N-diethylcarbamate and the like; isocyanuric acid derivatives, such as isocyanuric acid, N,N',N''-trimethylisocyanuric acid and the like; compounds containing thiocarbonyl group corresponding to aforesaid carbonyl compounds; and the like compounds. The modifier is not particularly limited so long as the modifier can react with the active end of the polymer chain.

Temperature of the polymerization is generally in the range of −20° to 150° C., preferably in the range of 0° to 120° C.

Monomer concentration in the reaction solution is generally in the range of 5 to 50 weight %, preferably in the range of 10 to 35 weight %. The reaction time of the polymerization is not particularly limited but generally is in the range of several seconds to several hours.

The polymerization reaction is conducted by bringing the monomer with the initiator in a liquid phase. The polymerization is preferably conducted under a pressure which is sufficient for keeping the polymerization system in the liquid phase. It is also preferred that any substance hindering the catalyst action is excluded from all the materials charged to the reaction system.

After finishing the reaction, the polymer can be recovered either by removing the solvent by blowing steam into the polymer solution or by coagulating the polymer by the addition of a poor solvent, followed by drying with the use of heated rolls or in a vacuum. The polymer can also be recovered removing the solvent with the use of heat rolls or in a vacuum.

The present invention includes the rubber composition obtained by using the aforesaid tin compound.

The rubber composition of the present invention comprises 100 weight parts of a rubber material containing 30 weight parts or more of a polymer having number-average molecular weight of $5 \times 10^4$ to $80 \times 10^4$ which is obtained by copolymerizing, in a hydrocarbon solvent in the presence of an organolithium compound as the initiator, (1) at least one of conjugated dienes and vinylaromatic hydrocarbons and (2) a vinyl-substituted benzylorganotin compound monomer of general formula A; 20 to 100 weight parts of carbon; and 0.1 to 5 weight parts of a vulcanizing agent.

According to the present invention, for example, 3 molecules in average of vinyltributylbenzyltin are copolymerized in a random copolymer chain of butadiene and styrene when a 3 tool equivalent of vinylbenzyltributyltin is added to 1 mol of lithium at the active end of the polymer chain in random copolymerization of butadiene and styrene in a hydrocarbon solvent in the presence of butyllithium as the initiator and an ether, as described above. The rubber composition of the present invention obtained by using the copolymer containing tin was found to have a remarkable effect of decreasing hysteresis loss. Because the copolymerization of the present invention proceeds with a mechanism of the anionic living polymerization, it is also possible that an end of a polymer chain is modified through the combination of the lithium at the active end of the chain and a coupling agent, such as halogenated tin compounds. It was found that the decrease of the hysteresis loss of the rubber composition was even more remarkable in this case.

The polymer in the rubber composition of the present invention comprises (1) a conjugated diene unit or a conjugated diene unit and a vinylaromatic hydrocarbon unit and (2) a unit of the organotin compound monomer. Therefore, examples of the polymer obtained are a copolymer of a conjugated diene/an organotin compound monomer and a copolymer of a conjugated diene/a vinylaromatic hydrocarbon/an organotin compound monomer.

The above descriptions on the initiator, the monomers, the modifiers, the ether compounds, the tertiary amine compounds and the conditions of polymerization for the aforesaid polymer containing the vinyl-substituted benzylorganotin compounds can be applied to the corresponding materials and conditions in the preparation of the polymer used in the rubber composition of the present invention.

Amounts of monomer used for preparing the polymer are the same as those described for the preparation of the aforesaid polymer containing the organotin compound monomer.

Number-average molecular weight of the polymer in the rubber composition of the present invention is $5 \times 10^4$ to $80 \times 10^4$, preferably $5 \times 10^4$ to $60 \times 10^4$, more preferably $10 \times 10^4$ to $35 \times 10^4$, when the modifier is not added or before the addition of the modifier. When the number-average molecular weight is less than $5 \times 10^4$, the effect of the organotin compound monomer of the present invention is not sufficiently exhibited. When the number-average molecular weight is more than $80 \times 10^4$, rubber properties and the workability of mixing with carbon black are inferior. Molecular weight of the polymer can be easily controlled by adjusting concentration of the organolithium initiator.

Rubber material in the rubber composition of the present invention is used in actual practice as a blend of the above polymer with natural rubber or other synthetic rubbers. It is necessary in the blending that the polymer is contained in an amount of 30 weight % or more, preferably 40 weight % or more, in the rubber material. When the polymer is blended with natural rubber, for example, the content of the polymer that is lower than 30 weight % causes a decrease in wet skid resistance, resulting in a deterioration in the desired balance between properties required as the rubber composition. Thus, the content of the polymer outside of the specified range is not preferable.

Examples of the synthetic rubber used for blending are cis-1,4-polyisoprene, styrene-butadiene copolymer, low cis-1,4-polybutadiene, high cis-1,4-polybutadiene, ethylene-propylene-diene copolymer, polychloroprene, halogenated butyl rubber, acrylonitrile-butadiene rubber (NBR) and the like.

The amount of carbon black in the rubber composition of the present invention is 20 to 100 weight parts, preferably 25 to 80 weight parts, based on 100 weight parts of the rubber material. When the amount is less than 20 weight parts, tensile strength and abrasion resistance of the vulcanizate are not sufficient. When the amount is more than 100 weight parts, rolling resistance (hysteresis loss) is inferior. Examples of the carbon black used are HAF, ISAF, SAF and the like carbon blacks. It is preferred that a carbon black having iodine absorption (IA) of 60 mg/g or more and dibutyl phthalate absorption (DBP) of 80 ml/100g or more be used.

An example of the vulcanizing agent is sulfur. The amount of vulcanizing agent used in the rubber composition is 0.1 to 5 weight parts, preferably 1 to 2 weight parts per 100 weight parts of the rubber material. When the amount is less than 0.1 weight parts, tensile strength, abrasion resistance and hysteresis loss of the vulcanized rubber decrease. When the amount is more than 5 weight parts, rubber elasticity is lost.

Examples of the process oil which may be used in the rubber composition of the present invention are paraffinic oils, naphthenic oils and aromatic oils. Aromatic oils are preferable for applications in which tensile strength and abrasion resistance are important. Paraffinic oils or naphthenic oils are used for applications in which hysteresis loss and low temperature properties are important. The amount of the process oil used is 0 to 100 weight parts per 100 weight parts of the rubber material. When the amount is more than 100 weight parts, tensile strength and low hysteresis loss are significantly deteriorated.

The vulcanization accelerator which may be used in the rubber composition of the present invention is not particularly limited. Preferable examples of the vulcanization accelerator are thiazole accelerators, such as M (2-mercaptobenzothiazole), DM (dibenzothiazyl disulfide), CZ(N-cyclohexyl-2-benzothiazylsulfenamide) and the like, and guanidine accelerators, such as DPG (diphenylguanidine) and the like. The amount of the vulcanization accelerator used in the rubber composition is 0.1 to 5 weight parts, preferably 0.2 to 3 weight parts, per 100 weight parts of the rubber material.

In the rubber composition of the present invention, anti-aging agents, fillers other than carbon black, such as silica, calcium carbonate, titanium oxide and the like, and additives, such as zinc oxide, stearic acid, antioxidants, antiozone agents and the like, which are generally used in the rubber industry may be mixed in addition to the components described above.

The rubber composition of the present invention can be obtained by mixing the components with a mixing machine, such as rolls, an internal mixer and the like. It is vulcanized after being formed and molded and used as tire parts, such as tread, under tread, carcass, side walls and beads, as well as industrial applications, such as antivibration rubbers, belts, hoses and the like. It is particularly advantageous when used as a tire tread rubber.

The invention will be understood more readily with reference to the following examples; however, these examples are intended to illustrate the invention and are not to be construed to limit the scope of the invention.

Part and % described in examples are weight part and weight % unless otherwise mentioned.

Measurements were conducted according to the following methods.

Number-average molecular weight ($M_n$) and molecular weight distribution of a polymer were measured by gel permeation chromatography (GPC) with use of a differential refractivity index (RI) and ultraviolet absorption at 254 nm (UV).

The microstructure of a butadiene part of a copolymer was obtained by an infrared method (Morero's method). Content of bound styrene was obtained by an infrared method using a calibration curve based on the absorption of phenyl group at 699 cm$^{-1}$.

Various methods have been proposed for measurement of concentration of active lithium at the polymer chain end. In the present examples, the concentration was regarded to be 68 mol % of the concentration of the organolithium initiator charged at the beginning of the polymerization. Even though solvent and other materials are generally used in polymerization with an organolithium initiator after they have been thoroughly purified in advance, a part of the organolithium initiator is deactivated by impurities, such as water, carbon dioxide and the like, contained in the polymerization system in general practice of the polymerization. Molecular weight distribution of the polymer obtained by the polymerization of a conjugated diene and/or a vinylaromatic hydrocarbon with an organolithium compound as the initiator is sufficiently narrow as shown by the value of $M_w/M_n$ of around 1.1. In this case, it is known that number-average molecular weight ($M_n$) of the polymer obtained by the polymerization is theoretically expressed by the following equation I [Takayuki Otsu, "Experimental Methods of Polymer Synthesis", page 212, published by Kagaku Dojin].

$$M_n = \left[ \frac{\text{(mol of monomer)}}{\text{(mol of organolithium initiator)}} \right] \times \text{(molecular weight of monomer)} \quad \text{equation I}$$

It was found that equation I was approximately valid in experiments of polymerization in the present invention, as well. Concentration of the organolithium initiator is assumed to follow equation II in which a specific fraction dependent on the amount of impurity was introduced.

$$\begin{aligned}\text{(concentration of lithium at the active end of the polymer)} &= \\ \text{(mol of effective organolithium initiator)} &= \\ \text{(mol of organolithium initiator charged at the beginning of} & \\ \text{the polymerization)} &\times \\ \text{(fraction of organolithium remaining active)} & \end{aligned} \quad \text{equation II}$$

It is apparent that equation II holds when runs of polymerization are conducted in the same reactor using solvent, monomers for polymerization and other materials of the same lots. Furthermore, this equation has been applied to industrial processes and other processes empirically and proved to hold generally. Therefore, preliminary experiments were conducted before the experiments of the present examples and the fraction of organolithium remaining active was obtained to be 68% from equations I and II. Thus, concentration of active lithium at the polymer chain end was regarded to be 68% of the mol of an organolithium initiator charged at the beginning of the polymerization.

Loss factor (tan δ) of a vulcanizate of a polymer was measured by using a measuring apparatus of viscoelasticity (a product of Rheometrix Co.) at a temperature of 50° C., a strain of 1% and a frequency of 15 Hz. A lower value of tan δ was regarded to show a lower hysteresis loss, and hence better fuel economy. Tensile properties were measured according to the method of Japanese Industrial Standard K 6301.

For measurement of content of tin, a polymer of the present invention was purified by dissolving in toluene, then precipitating by pouring into methanol. The content of tin was measured with the purified polymer using an atomic absorption instrument. [Example 1]

(Synthesis of vinylbenzyltributyltin)

Into a glass reactor equipped with a stirrer which had been purged with argon Δ, 2.6 g of magnesium metal, a small amount of iodine and 40 ml of thoroughly purified and dried diethyl ether were charged and stirred for 60 minutes at room temperature.

Figure 1A:
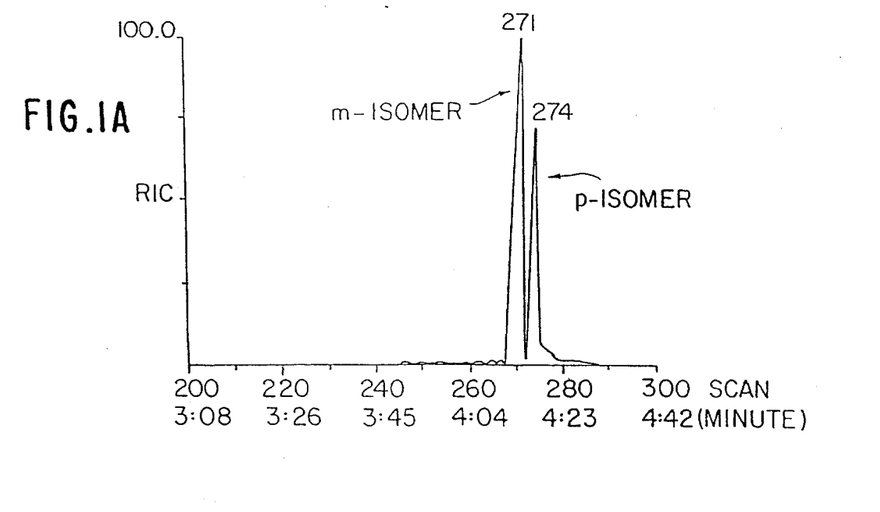
FIG. 1 shows a GC chart of chloromethylstyrene in an example of the present invention. The chart at the upper right in FIG. 1 shows an expanded chart of a part of scan 200 to 300.
Figure 1B:
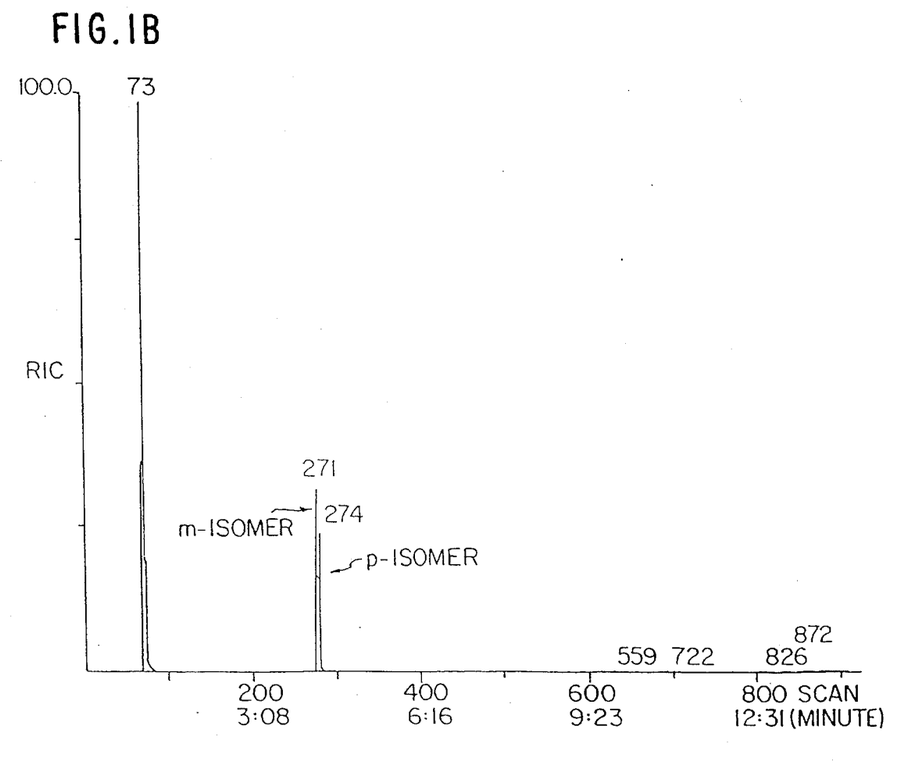

Into this mixture, a solution prepared by dissolving 15.7 g of chloromethylstyrene (a product of Tokyo Kasei Co., Ltd.) into 40 ml of diethyl ether was dropped slowly at room temperature. After finishing the dropping, the reaction mixture was further stirred well for 4 hours at room temperature and a solution of vinylbenzylmagnesium chloride was obtained. The chloromethylstyrene used above was a mixture of m-isomer and p-isomer in which the m-isomer is the main component as shown in the GC chart in FIG. 1. GC was measured using HP-5890 (a product of Hewlett Packard Co.) and Column DB-5 while temperature was raised at the rate of 25° C./minute from 70° C. to 300° C.

The solution of vinylbenzylmagnesium chloride thus obtained was kept at 0° C. or lower by cooling from the outside and a solution prepared by dissolving 29.0 g of tributyltin chloride into 30 ml of diethyl ether was dropped in small quantities. After finishing the dropping, the reaction mixture was stirred well for an additional 1 hour at room temperature. After finishing the reaction, water was added to the reaction mixture and an ether layer was separated. The ether layer was washed with water several times and dried with anhydrous magnesium sulfate. Then, ether was removed from the ether layer to obtain a liquid product. The liquid product was purified by elution separation by column chromatography using silica gel as a filler and cyclohexane as the elution solvent to obtain vinylbenzyltributyltin (a mixture of m-isomer and p-isomer). The yield of the compound thus obtained was 83% based on the charged amount of tributyltin chloride.

(Identification of vinylbenzyltributyltin)

(1) GC-MS analysis

Figure 2:
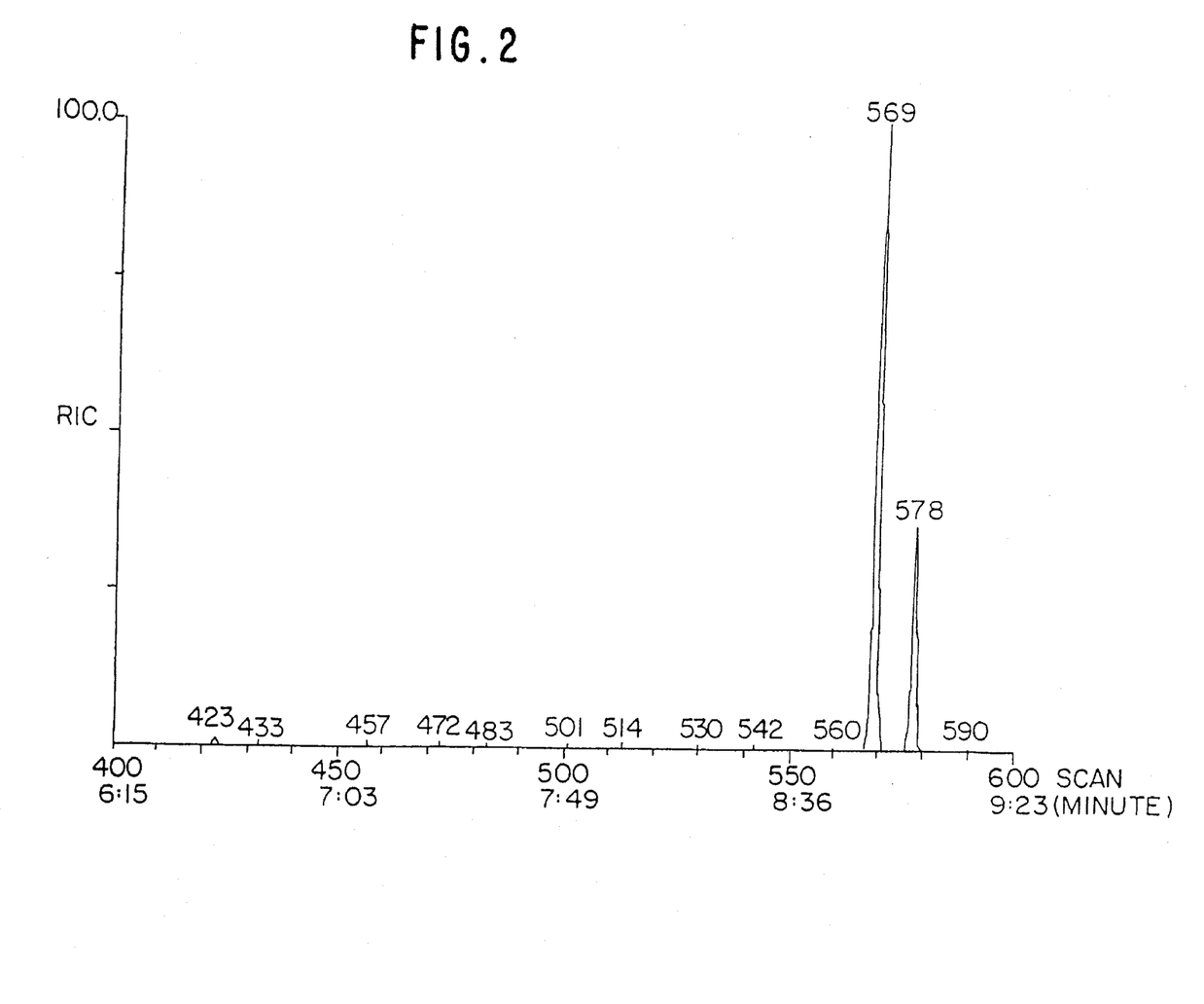
FIG. 2 shows a GC chart of vinylbenzyltributyltin in an example of the present invention.

The compound prepared as described above was analyzed using a GC-MS spectrometer. The instrument of the GC part was an HP-5890 (a product of Hewlett Packard C.) with Column DB-5 and an instrument of the MS part was Incos 50 (a product of Finnigan Mat Co.). The temperature of the measurement was raised at the rate of 25° C./minute from 70° C. to 300° C. FIG. 2 shows a GC chart of the compound prepared above. Two peaks are found at SCAN 569 and SCAN 578, which are assigned to m-isomer and p-isomer, respectively.

Figure 3A:
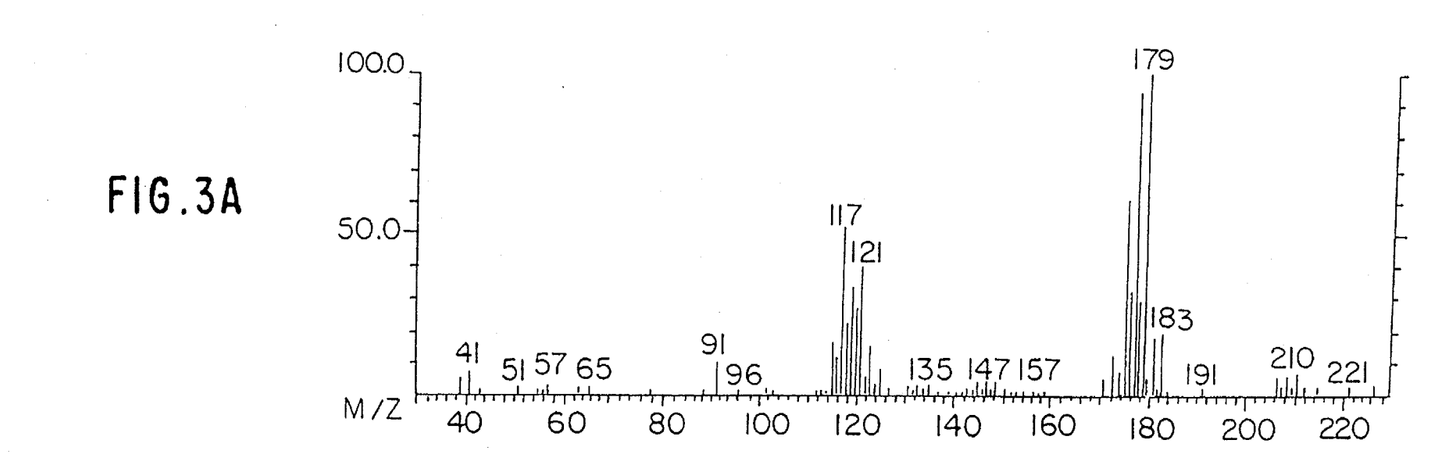
FIG. 3 shows an MS chart of vinylbenzyltributyltin (m-isomer) in an example of the present invention.
Figure 3B:
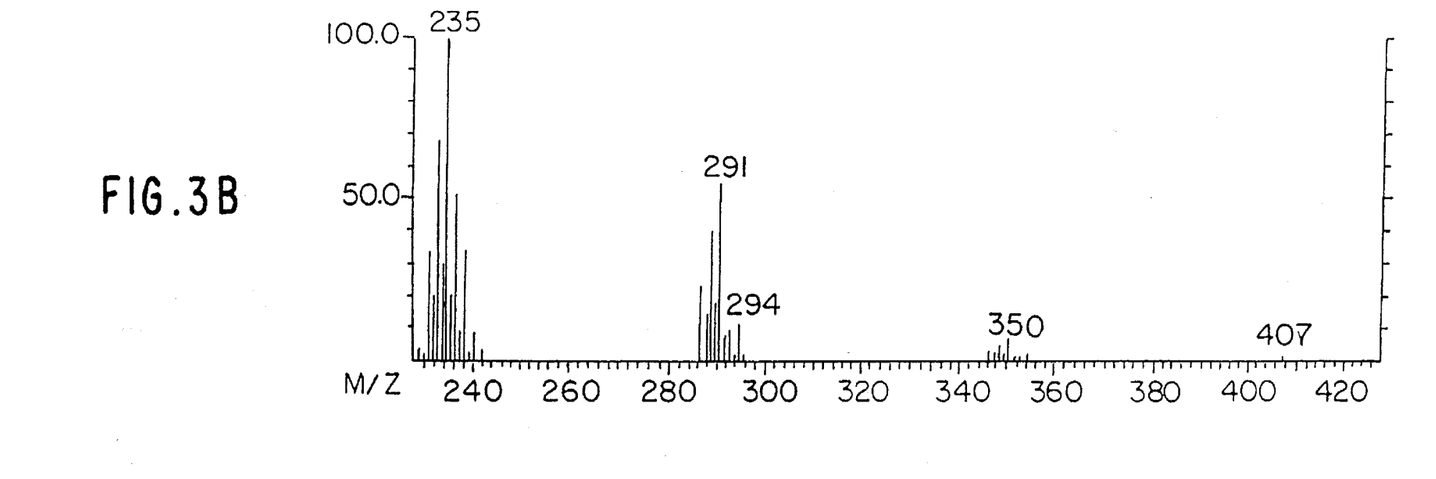

FIG. 3 shows an MS chart of SCAN 569 (m-isomer). Molecular ion peaks found in the chart are assigned to the ions shown in Table 1.

TABLE 1

| M/Z | kind of ion |
| --- | --- |
| 117 | vinylbenzyl ion |
| 120 | tin ion |
| 179 | butyltin ion |
| 235 | dibutyltin ion |
| 291 | tributyltin ion |
| 350 | vinylbenzyldibutyltin ion |

TABLE 1-continued

| M/Z | kind of ion |
| --- | --- |
| 407 | vinylbenzyltributyltin ion |

SCAN 578 (p-isomer) also showed a similar MS chart to that of SCAN 569.

From the result of GC-MS analysis shown above, it was confirmed that the compound analyzed was vinylbenzyltributyltin (a mixture of m-isomer and p-isomer).

(2) $^1$H-NMR analysis

The compound prepared as described above was analyzed by $^1$H-NMR. Measurement was conducted by using GX-400 (a product of Nippon Densi Co., Ltd.) at 400 MHz in chloroform-d ($CDCl_3$) as the solvent with tetramethylsilane (TMS) as the standard.

Figure 4:
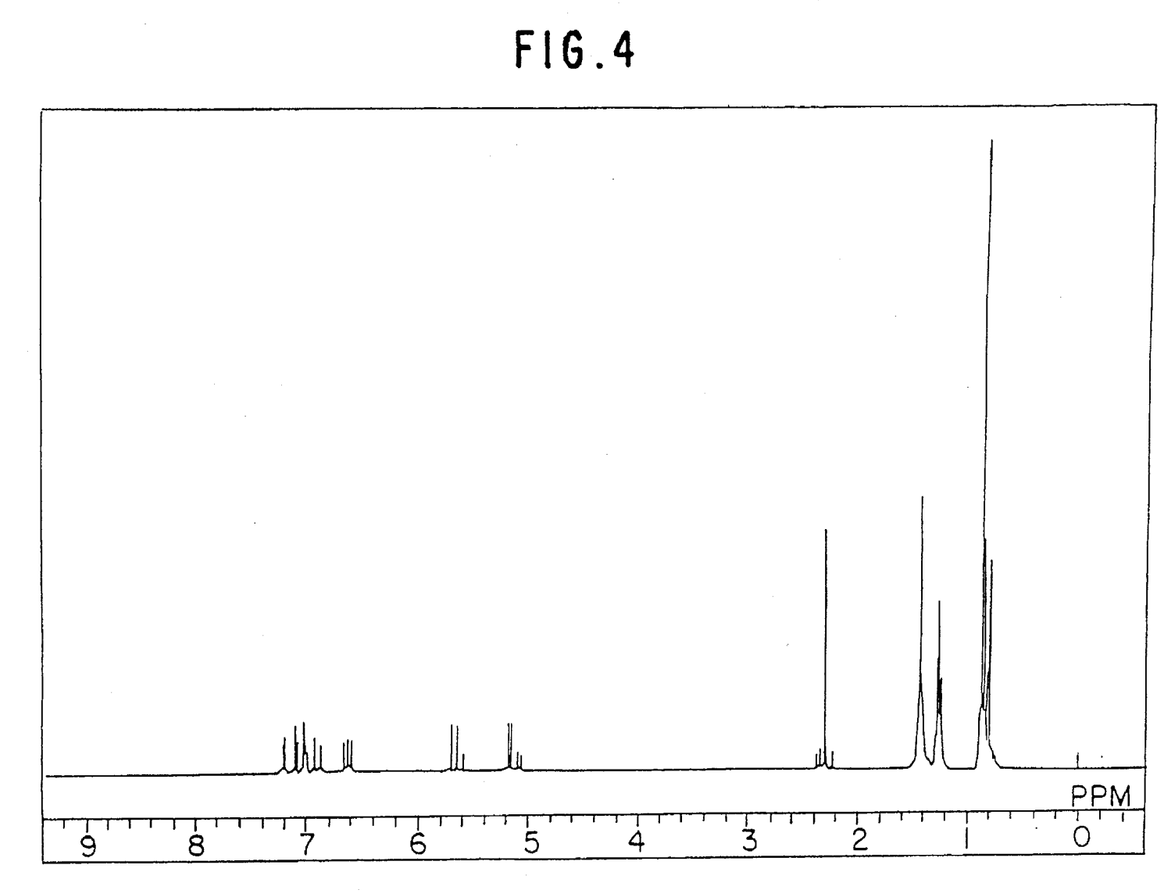
FIG. 4 shows an NMR chart of vinylbenzyltributyltin (a mixture of m- and p-isomers) in an example of the present invention.

FIG. 4 shows an NMR chart of the compound described above (a mixture of m-isomer and p-isomer) after purification with column chromatography. Peaks found in the chart are assigned to the protons shown in Table 2.

TABLE 2

| ppm | kind of proton |
| --- | --- |
| 0.79~1.46 | 27H, $(CH_3—CH_2—CH_2—CH_2)_3Sn$ |
| 2.32 | s, 2H, $—CH_2—Sn$ |
| 5.17 | d, 1H, $=CH_2$ |
| 5.70 | d, 1H, $=CH_2$ |
| 6.65 | 2d, 1H, $=CH—$ |
| 6.86~7.22 | 4H, aromatic proton |

From the result of $^1$H-NMR analysis shown above, it was confirmed that the compound analyzed was vinylbenzyltributyltin.

(Polymerization of vinylbenzyltributyltin) Polymerization was conducted in a pressure-resistant glass vessel made of Pyrex which had been thoroughly cleaned and attached with a Neoprene packing. Into the polymerization vessel, 1.0 g of vinylbenzyltributyltin (a mixture of m-isomer and p-isomer) obtained as described above and 20 ml of benzene which had been thoroughly dried and purified were charged. Then, a $1.1 \times 10^{-4}$ mol of sec-butyllithium which is an initiator of anionic polymerization was added to the mixture, and the mixture was reacted for 12 hours at room temperature. The polymerization system showed the red color characteristic of living anionic polymerization. After finishing the polymerization, methanol was added to the polymerization solution to terminate the polymerization. The product was reprecipitated with methanol, purified and dried to obtain a polymer with a yield of 98%.

The molecular weight of the polymer was measured by gel permeation chromatography (GPC) and calibrated by using monodisperse polystyrene as standard. Result shown in the following was obtained.

| | |
| --- | --- |
| Molecular weight (calculated) | 9090 |
| Molecular weight (measured) $M_n$ | 8690 |
| Molecular weight distribution $M_w/M_n$ | 1.13 |

This result shows that vinylbenzyltributyltin behaves as a chain reaction type monomer which is polymerized by the same mechanism as styrene and gives useful polymers.

Then, the polymer obtained was analyzed by $^1$H-NMR according to the same method as described above.

Figure 5:
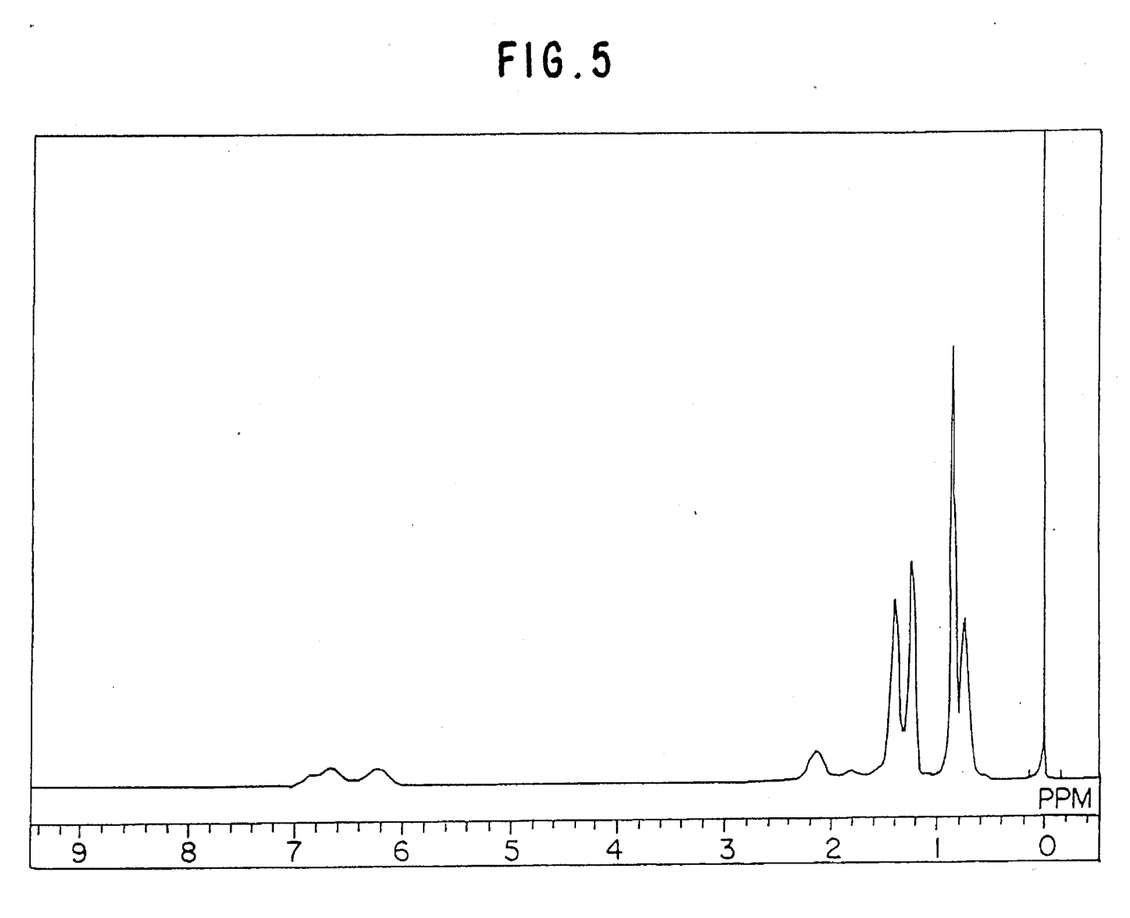
FIG. 5 show an NMR chart of polyvinylbenzyltributyltin in an example of the present invention.

FIG. 5 shows an NMR chart of the polymer, in which a peak found at 0.7~1.5 ppm is assigned to protons of —CH$_2$—CH— and (CH$_3$—CH$_2$—CH$_2$—CH$_2$)$_3$Sn, a peak found around 2.1 ppm is assigned to protons of —CH$_2$—Sn and a peak found at 6.2–6.9 ppm is assigned to aromatic protons. From the result of $^1$H-NMR analysis, it was confirmed that this compound was a polymer having the functional structure of benzyltributyltin.

[Example 2]

Into a 5 liter reactor equipped with a stirrer, 1500 g of cyclohexane, 250 g of 1,3-butadiene and 0.800 g of tetrahydrofuran were charged. After the temperature in the reactor was adjusted to 60° C., 0.118 g of n-butyllithium was added to start the polymerization.

Immediately after starting the polymerization by charging n-butyllithium, 0.509 g of vinylbenzyltributyltin (VBTBT hereinafter) which is an organotin compound of the present invention obtained by the method described above was added. The polymerization was conducted for further 60 minutes at 60° C. and terminated with isopropyl alcohol.

Then, 2.5 g of 2,6-di-tert-butyl-p-cresol was added to the solution containing polymer and the solvent was removed by steam stripping. The solid product obtained was dried with rolls heated to 100° C. and a rubbery polymer was obtained. Properties of the polymer are shown in Table 3.

The polymer was mixed and compounded according to the formulation shown in Table 5 with a 250 ml laboratory plastomill and 3 inch rolls. The compounded rubber was vulcanized at 145° C. for 35 minutes. Results of the evaluation of properties of the vulcanizate are shown in Table 4.

[Examples 3 and 4]

Polymerizations were conducted and polymers and vulcanizates were obtained by the same method as in Example 2 except that 1.526 g and 2.544 g of VBTBT were used in Example 3 and Example 4, respectively. Properties of the polymers are shown in Table 3 and results of the evaluation of properties of the vulcanizates are shown in Table 4.

[Comparative Example 1]

Polymerization was conducted and a polymer and a vulcanizate were obtained by the same method as in Example 2 except that VBTBT was not added. Properties of the polymer are shown in Table 3 and results of the evaluation of properties of the vulcanizate are shown in Table 4.

[Example 5]

Into a 5 liter reactor equipped with a stirrer, 1500 g of cyclohexane, 200 g of 1,3-butadiene, 50 g of styrene and 0.800 g of tetrahydrofuran were charged. After the temperature in the reactor was adjusted to 60° C., 0.118 g of n-butyllithium was added and polymerization was started.

Immediately after starting the polymerization by the addition of n-butyllithium, 0.509 g of VBTBT obtained by the method described above was added. The polymerization was conducted for a further 60 minutes at 60° C. and terminated with isopropyl alcohol.

Then, 2.5 g of 2,6-di-tertobutyl-p-cresol was added to the solution containing polymer and the solvent was removed by steam stripping. Solid product obtained was dried with rolls heated to 100° C. and a rubbery polymer was obtained. Properties of the polymer are shown in Table 3.

The polymer was mixed and compounded according to the formulation shown in Table 5 with a 250 ml laboratory plastomill and 3 inch rolls. The compounded rubber was vulcanized at 145° C. for 35 minutes. Results of the evaluation of properties of the vulcanizate are shown in Table 4.

[Examples 6 and 9]

Polymerizations were conducted and polymers and vulcanizates were obtained by the same method as in Example 5 except that 1.526 g and 2.544 g of VBTBT were used in Example 6 and Example 9, respectively. Properties of the polymers are shown in Table 3 and results of the evaluation of properties of the vulcanizates are shown in Table 4.

[Example 7]

Polymerization was conducted and a polymer and a vulcanizate were obtained by the same method as in Example 5 except that 1.526 g of VBTBT was mixed with 200 g of butadiene, 50 g of styrene and 0.800 g of tetrahydrofuran in advance and charged into the reactor and then polymerization was started. Properties of the polymer are shown in Table 3 and results of evaluation of properties of the vulcanizate are shown in Table 4.

[Example 8]

Polymerization was conducted and a polymer and a vulcanizate were obtained by the same method as in Example 6 except that coupling the polymer end was effected with 0.081 g of tin tetrachloride (SnCl$_4$) after conversion of the polymerization reached 100%. Properties of the polymer are shown in Table 3 and results of the evaluation of properties of the vulcanizate are shown in Table 4.

[Example 10]

Into a 5 liter reactor equipped with a stirrer, 1500 g of cyclohexane, 200 g of 1,3-butadiene, 50 g of styrene and 0.959 g of tetrahydrofuran were charged. After temperature in the reactor was adjusted to 60° C., 0.141 g of n-butyllithium was added and polymerization was started.

Immediately after starting the polymerization by the addition of n-butyllithium, 3.053 g of VBTBT obtained by the method described above was added. Polymerization was conducted and a polymer and a vulcanizate were obtained by the same method as in Example 5 except for the procedures described above. Properties of the polymer are shown in Table 3 and results of the evaluation of properties of the vulcanizate are shown in Table 4.

[Comparative Example 2]

Polymerization was conducted and a polymer and a vulcanizate were obtained by the same method as in Example 5 except that VBTBT was not added. Properties of the polymer are shown in Table 3 and results of the evaluation of properties of the vulcanizate are shown in Table 4.

TABLE 3

| | amount of Li at the end of polymer (mmol/100 g monomer) | amount of added vinyl-benzyl-tributyltin (mmol/100 g monomer) | properties of polymer | | | | |
|---|---|---|---|---|---|---|---|
| | | | content of tin (mmol/100 g polymer) | number-average molecular weight Mn ($\times 10^4$) | Mw/Mn | content of vinyl in the butadiene part (%) | content of bound styrene (%) |
| Comparative Example 1 | 0.50 | none | 0 | 20 | 1.1 | 37 | 0 |
| Example 2 | 0.50 | 0.50 | 0.5 | 20 | 1.1 | 37 | 0 |
| Example 3 | 0.50 | 1.50 | 1.4 | 20 | 1.1 | 36 | 0 |
| Example 4 | 0.50 | 2.50 | 2.4 | 20 | 1.1 | 37 | 0 |
| Comparative Example 2 | 0.50 | none | 0 | 20 | 1.1 | 37 | 20 |
| Example 5 | 0.50 | 0.50 | 0.5 | 20 | 1.1 | 37 | 20 |
| Example 6 | 0.50 | 1.50 | 1.4 | 20 | 1.1 | 37 | 20 |
| Example 7 | 0.50 | 1.50 | 1.4 | 20 | 1.1 | 37 | 20 |
| Example 8 | 0.50 | 1.50 | 1.7 | 43 | 1.4 | 37 | 20 |
| Example 9 | 0.50 | 2.50 | 2.4 | 20 | 1.1 | 37 | 20 |
| Example 10 | 0.60 | 3.00 | 2.9 | 17 | 1.1 | 38 | 20 |

TABLE 4

| | Properties of Vulcanizate | | |
|---|---|---|---|
| | elongation (%) | tensile strength (kgf/cm$^2$) | tan δ at 50° C. |
| Comparative Example 1 | 420 | 165 | 0.133 |
| Example 2 | 410 | 176 | 0.115 |
| Example 3 | 390 | 181 | 0.099 |
| Example 4 | 380 | 189 | 0.095 |
| Comparative Example 2 | 460 | 197 | 0.162 |
| Example 5 | 380 | 215 | 0.130 |
| Example 6 | 390 | 228 | 0.115 |
| Example 7 | 390 | 226 | 0.116 |
| Example 8 | 380 | 250 | 0.095 |
| Example 9 | 380 | 237 | 0.097 |
| Example 10 | 390 | 231 | 0.098 |

TABLE 5

| polymer | 100 part |
|---|---|
| HAF carbon black | 50 |
| stearic acid | 2 |
| aromatic oil | 10 |
| antioxidant 6C[1] | 1 |
| zinc oxide | 3 |
| accelerator DPG[2] | 0.5 |
| accelerator DM[3] | 1.0 |
| sulfur | 1.5 |

Notes
[1] N-(1,3-dimethylbutyl)-N'-phenyl-p-phenylenediamine
[2] diphenylguanidine
[3] dibenzothiazyl disulfide The copolymers in the present examples were high molecular weight copolymers containing tin efficiently in the molecule as shown in Table 3. Content of tin can be adjusted as desired. Copolymers containing tin could be obtained and the copolymers obtained had the same properties either when VBTBT was added immediately after starting the polymerization of butadiene or the copolymerization of butadiene and styrene (Examples 2, 6 and others) or when VBTBT was charged together with butadiene and styrene before starting the polymerization (Example 7).

As shown in Table 4, vulcanizates of the copolymers in the present examples were found to have higher tensile strength and lower tan δ than those of conventional copolymers (Comparative Examples 1 and 2). Thus, copolymers of the present invention exhibited superior properties. The properties of the vulcanizates were further superior when the content of VBTBT was increased (Examples 2 to 4, Examples 5 and 6 and Examples 9 and 10). This relation could be found in both the copolymers of butadiene and VBTBT (Examples 2 to 4) and the copolymers of styrene, butadiene and VBTBT (Examples 6, 9 and 10). Thus, it could be shown that this relation was independent of the kind of monomer copolymerized with VBTBT.

The molecular weight of a copolymer of VBTBT was increased by coupling the copolymer with tin tetrachloride as expected (Example 8). This result clearly shows that the copolymerization in the present invention propagates through the living mechanism and an active lithium is present at the end of the polymer. It is also shown that properties of the vulcanizate were improved by the coupling and the effect of the polymer of the present invention could be further enhanced by the coupling of the polymer with a modifier after finishing the polymerization reaction.

The rubber composition of the present invention will be understood more readily with reference to the following examples; however, these examples are intended to illustrate the invention and are not to be construed to limit the scope of the invention.

In the polymerization using an organolithium initiator, it is known that a part of the initiator is deactivated by impurities (catalyst poisons), such as water, carbon dioxide and the like, contained in the polymerization system even when solvent and other materials employed are thoroughly purified in advance. For the purpose of reducing the impurities which deactivates the initiator harmless in advance, it is generally practiced that an organolithium is added as scavenger in an amount exactly necessary for reducing the impurities harmless so that the added organolithium acts as a scavenger alone without effecting polymerization. In the present examples, a small amount of sec-butyllithium was added as the scavenger before polymerization and thereafter a specified amount of an organolithium was added to start the polymerization. The amount of the organolithium used to start polymerization was regarded to be the amount of the lithium at the end of the polymer chain. The amount of sec-butyllithium necessary as the scavenger was obtained by adding sec-butyllithium slowly and in small quantities to the polymerization system containing monomers for the polymerization and solvent until an increase of temperature of the polymerization system was observed. Polymerization condition can be considered to be identical in all Examples and Comparative Examples of the present invention because the same reactor was used and the same amount of solvent from the same lot and approximately the same amount of monomers for polymerization from the same lot were used in all Examples and Comparative Examples. As the result of experiments conducted in advance, the amount of sec-butyllithium consumed as the scavenger was 0.33 mmol based on 1 kg of monomers for polymerization and a solvent. This amount of sec-butyllithium was added to the polymerization system before starting the polymerization in each Example and Comparative Example.

As the index for hysteresis loss and rolling resistance of a vulcanizate of a rubber composition, tan δ was adopted. A lower value of tan δ was regarded to show a lower hysteresis loss, hence lower rolling resistance. Measurement of tan δ was conducted according to the method described above.

Pico abrasion was adopted as the index of abrasion resistance. Pico abrasion was measured according to the method of ASTM D-2228 using a Goodrich Pico abrasion tester at room temperature.

Wet skid resistance was measured on a wet asphalt surface at 25° C. using a wet skid tester (a product of Stanley Co., UK).

[Example 11]

Into a 5 liter reactor equipped with a stirrer, 1500 g of cyclohexane, 200 g of 1,3-butadiene, 50 g of styrene, 1.35 g of tetrahydrofuran and 1.526 g of vinylbenzyltributyltin were charged. After the temperature in the reactor was adjusted to 50° C., 0.08 g of n-butyllithium was added and polymerization was started. The polymerization was conducted for 90 minutes at 50° C. and terminated with isopropyl alcohol.

Then, 2.5 g of 2,6-di-tert-butyl-p-cresol was added to the solution containing polymer and the solvent was removed by steam stripping. The solid product obtained was dried with rolls heated to 100° C. and rubbery Polymer A was obtained. Properties of the polymer are shown in Table 6.

Polymer A was mixed and compounded according to the formulation shown in Table 7 with a 250 ml laboratory plastomill and 3 inch rolls. Natural rubber and the polymer containing the organotin compound were blended in specified amounts in the compounding. The compounded rubber was vulcanized at 145° C. for 35 minutes and properties of the vulcanizate were evaluated. Results of the evaluation are shown in Table 8.

[Examples 12 to 14]

In Example 12, Polymer B and a vulcanizate thereof were obtained by the same method as that to obtain Polymer A and the vulcanizate thereof except that 0.891 g of tetrahydrofuran, 1.018 g of vinylbenzyltributyltin and 0.053 g of n-butyllithium were used. In Example 13, Polymer C and a vulcanizate thereof were obtained by the same method as that to obtain Polymer A and the vulcanizate thereof except that 0.54 g of tetrahydrofuran, 0.611 g of vinylbenzyltributyltin and 0.032 g of n-butyllithium were used. In Example 14, Polymer D and a vulcanizate thereof were obtained by the same method as that to obtain Polymer A and the vulcanizate thereof except that 0.324 g of tetrahydrofuran, 0.366 g of vinylbenzyltributyltin and 0.019 g of n-butyllithium were used. Results of the evaluation of properties of the polymers and the vulcanizates are shown in Tables 6 and 8.

[Examples 15 and 16]

Polymer E and a vulcanizate thereof and Polymer F and a vulcanizate thereof were obtained in Examples 15 and 16, respectively, by the same method as that to obtain Polymer A and the vulcanizate thereof except that 2.543 g and 5.087 g of vinylbenzyltributyltin were used in Examples 15 and 16, respectively. Results of the evaluation of properties of the polymers and the vulcanizates are shown in Tables 6 and 8.

[Example 17]

Polymer G and a vulcanizate thereof were obtained by the same method as that in Example 11 except that 1500 g of cyclohexane, 162.5 g of 1,3-butadiene, 87.5 g of styrene, 0.45 g of tetrahydrofuran and 1.526 g of vinylbenzyltributyltin were charged into the reactor. Results of the evaluation of properties of the polymer and the vulcanizate are shown in Tables 6 and 8.

[Example 18]

Into a 5 liter reactor equipped with a stirrer, 1500 g of cyclohexane, 200 g of 1,3-butadiene, 50 g of styrene and 3.15 g of tetrahydrofuran were charged. After the temperature in the reactor was adjusted to 50° C., 0.08 g of n-butyllithium was added and polymerization was started. After the polymerization was conducted for 90 minutes at 50° C., 1.526 g of vinylbenzyltributyltin was added. Polymerization was continued for an additional 10 minutes and then terminated with isopropyl alcohol. Thereafter, the same procedures as those in Example 11 were conducted and Polymer H and a vulcanizate thereof was obtained. Results of the evaluation of properties of the polymer and the vulcanizate are shown in Tables 6 and 8.

[Example 19]

Polymer I and a vulcanizate thereof were obtained by the same method as that in Example 11 except that 0.082 g of tin tetrachloride ($SnCl_4$) was added after finishing the polymerization in place of isopropyl alcohol terminating the polymerization. Results of the evaluation of properties of the polymer and the vulcanizate are shown in Tables 6 and 8.

[Comparative Example 3]

Polymer J and a vulcanizate thereof were obtained by the same method as that in Example 11 except that vinylbenzyltributyltin was not used. Results of the evaluation of properties of the polymer and the vulcanizate are shown in Tables 6 and 8.

[Comparative Example 4]

Polymer K and a vulcanizate thereof were obtained by the same method as that used to obtain Polymer A except that 6.75 g of tetrahydrofuran, 7.631 g of vinylbenzyltributyltin and 0.4 g of n-butyllithium were used. Results of the evaluation of properties of the polymer and the vulcanizate are shown in Tables 6 and 8.

[Example 20]

A vulcanizate was obtained by the same methods as in Example 11 except that 40 weight parts of Polymer A and 60 weight parts of natural rubber (NR) were blended in the compounding. Results of the evaluation of properties of the vulcanizate are shown in Table 8.

[Comparative Example 5]

A vulcanizate was obtained by the same methods as in Example 11 except that 20 weight parts of Polymer A and 80 weight parts of natural rubber (NR) were blended in the compounding. Results of the evaluation of properties of the vulcanizate are shown in Table 8.

TABLE 6

| polymer | amount of Li at the end of polymer (X) (mmol/100 g monomer) | amount of added vinyl-benzyl-tributyltin (Y) (mmol/100 g monomer) | Y/X | content of bound styrene (%) | content of vinyl in the butadiene part (%) | number-average molecular weight Mn (× 10⁴) |
|---|---|---|---|---|---|---|
| A | 0.5 | 1.5 | 3 | 20 | 45 | 20 |
| B | 0.33 | 1.0 | 3 | 20 | 45 | 30 |
| C | 0.2 | 0.6 | 3 | 20 | 45 | 52 |
| D | 0.12 | 0.36 | 3 | 20 | 45 | 75 |
| E | 0.5 | 2.5 | 5 | 20 | 45 | 21 |
| F | 0.5 | 5.0 | 10 | 20 | 45 | 21 |
| G | 0.5 | 1.5 | 3 | 35 | 26 | 20 |
| H | 0.5 | 1.5 | 3 | 20 | 55 | 20 |
| I | 0.5 | 1.5 | 3 | 20 | 45 | 44 |
| J | 0.5 | none | 0 | 20 | 45 | 20 |
| K | 2.5 | 7.5 | 3 | 20 | 45 | 4 |

TABLE 7

| rubber material | 100 weight part |
|---|---|
| NR*¹ | x |
| polymer containing tin | 100 − x |
| HAF carbon black | 45 |
| aromatic oil | 5 |
| stearic acid | 2 |
| antioxidant 6C*² | 1 |
| zinc oxide | 3 |
| accelerator DPG*³ | 0.5 |
| accelerator DM*⁴ | 1.0 |
| sulfur | 1.5 |

Notes
*¹natural rubber
*²N-(1,3-dimethylbutyl)-N'-phenyl-p-phenylenediamine
*³diphenylguanidine
*⁴dibenzothiazyl disulfide

TABLE 8

| | polymer | amount of blending (NR/polymer containing tin) | tensile strength (kgf/cm²) | elongation (%) | tan δ at 50° C. | Pico abrasion *¹ (index) | wet skid resistance*¹ (index) |
|---|---|---|---|---|---|---|---|
| Example 11 | A | 30/70 | 240 | 490 | 0.115 | 110 | 100 |
| Example 12 | B | 30/70 | 250 | 500 | 0.110 | 110 | 100 |
| Example 13 | C | 30/70 | 250 | 490 | 0.116 | 115 | 100 |
| Example 14 | D | 30/70 | 220 | 480 | 0.125 | 90 | 100 |
| Example 15 | E | 30/70 | 240 | 480 | 0.110 | 110 | 105 |
| Example 16 | F | 30/70 | 240 | 460 | 0.108 | 115 | 105 |
| Example 17 | G | 30/70 | 260 | 500 | 0.123 | 120 | 100 |
| Example 18 | H | 30/70 | 240 | 480 | 0.121 | 110 | 110 |
| Example 19 | I | 30/70 | 250 | 490 | 0.111 | 110 | 100 |
| Comparative Example 3 | J | 30/70 | 210 | 520 | 0.153 | 100 | 100 |
| Comparative Example 4 | K | 30/70 | 190 | 530 | 0.148 | 85 | 105 |
| Example 20 | A | 60/40 | 250 | 540 | 0.125 | 110 | 95 |
| Comparative Example 5 | A | 80/20 | 260 | 550 | 0.126 | 110 | 85 |

Note
*¹Index relative to the value of 100 in Comparative Example 1.

As the results in Table 8 show, it was made clear that low hysteresis loss of the vulcanizates of the rubber compositions of the present invention decreased by the effect of tin in the copolymer containing tin compounded in the rubber material and the vulcanizates exhibited a good balance between fracture properties, abrasion resistance and wet skid resistance. The results also show that the effect of tin to decrease low hysteresis loss can be found when molecular weight of the polymer containing tin is in the range of $5 \times 10^4$ to $80 \times 10^4$ (Examples 11 to 20), that the good balance between the properties can be found when the molecular weight of the polymer containing tin is in the range specified above and, furthermore, content of the polymer containing tin in the rubber material is 30 weight % or more (Examples 11 to 20) and that these favorable effects cannot be found when the conditions are outside of the ranges specified above (Comparative Examples 4 and 5).

The results further made it clear that the favorable effects could be found when the copolymer containing tin was a copolymer having random distribution of the organotin compound monomer unit as well as when it was a copolymer having block distribution of the organotin compound monomer unit (Example 18). Therefore, the favorable effects are exhibited without being limited by the distribution of the organotin compound monomer. Hysteresis loss and abrasion resistance were improved with the increase in the amount of the organotin compound monomer (Examples 15 and 16).

It was also made clear that a rubber composition having a good balance between low hysteresis loss, wet skid resistance, fracture properties and abrasion resistance could be obtained even when the content of styrene or the content of vinyl structure was relatively high (Examples 17 and 18).

It was also shown that a modifier, such as tin tetrachloride, could be brought into reaction with the chain end of the polymer containing tin and low hysteresis loss could be further decreased by the reaction.

What is claimed is:

1. A copolymer, comprising:
   (1) at least one of conjugated diene units and vinylaromatic hydrocarbon units; and
   (2) units of a vinyl-substituted benzylorganotin compound monomer of formula (A):

wherein $R^1$, $R^2$, $R^3$, $R^4$, $R^5$, $R^6$ and $R^7$ are each a hydrogen atom or an aliphatic, alicyclic or aromatic hydrocarbon group having 1 to 30 carbon atoms, $R^8$, $R^9$ and $R^{10}$ are each an aliphatic, alicyclic or aromatic hydrocarbon group having 1 to 30 carbon atoms, and $R^1$, $R^2$, $R^3$, $R^4$, $R^5$, $R^6$, $R^7$, $R^8$, $R^9$ and $R^{10}$ may be the same or different from each other.

2. A copolymer as claimed in claim 1, wherein $R^1R^2C=CR^3-$ is bonded to a m-position or a p-position of the benzene ring.

3. A copolymer as claimed in claim 1, wherein $R^2$, $R^2$, $R^3$, $R^4$, $R^5$, $R^6$ and $R^7$ are each a hydrogen atom or an aliphatic, alicyclic or aromatic hydrocarbon group having 1 to 20 carbon atoms and $R^8$, $R^9$ and $R^{10}$ are each an aliphatic, alicyclic or aromatic hydrocarbon group having 1 to 20 carbon atoms.

4. A copolymer as claimed in claim 1, wherein $R^1$, $R^2$, $R^3$, $R^4$, $R^5$, $R^6$ and $R^7$ are each hydrogen atoms and $R^8$, $R^9$ and $R^{10}$ are each a hydrocarbon group selected from the group consisting of a methyl group, an ethyl group, a propyl group, an n-butyl group, a sec-butyl group, a t-butyl group, a octyl group, a cyclohexyl group, a cyclopentadienyl group, a phenyl group, a tolyl group, 1 xylyl group, 1 naphthyl group and 1 phenanthryl group.

5. A copolymer as claimed in claim 1, wherein said vinyl-substituted benzylorganotin compound monomer is selected from the group consisting of m-vinylbenzyltributyltin, m-vinylbenzyltrioctyltin, m-vinylbenzyltriphenyltin, m-(1-phenylvinyl)-benzyltributyltin, a p-isomer of one of these compounds and a p-isomer and m-isomer mixture of one of these compounds.

6. A copolymer as claimed in claim 1, wherein said conjugated diene is butadiene.

7. A copolymer as claimed in claim 1, wherein said vinylaromatic hydrocarbon is styrene.

8. A copolymer as claimed in claim 1, wherein said conjugated diene is butadiene, said vinylaromatic hydrocarbon is styrene and said vinyl-substituted benzylorganotin compound is vinylbenzyltributyltin.

* * * * *